United States Patent
Sarvestani

(10) Patent No.: US 9,369,287 B1
(45) Date of Patent: Jun. 14, 2016

(54) SYSTEM AND METHOD FOR APPLYING A DIGITAL SIGNATURE AND AUTHENTICATING PHYSICAL DOCUMENTS

(71) Applicant: Seyed Amin Ghorashi Sarvestani, Keppel Bay (SG)

(72) Inventor: Seyed Amin Ghorashi Sarvestani, Keppel Bay (SG)

( * ) Notice: Subject to any disclaimer, the term of this patent is extended or adjusted under 35 U.S.C. 154(b) by 0 days.

(21) Appl. No.: 14/627,697

(22) Filed: Feb. 20, 2015

Related U.S. Application Data

(63) Continuation-in-part of application No. 14/606,589, filed on Jan. 27, 2015, now abandoned.

(51) Int. Cl.
*H04L 29/06* (2006.01)
*H04L 9/32* (2006.01)
*H04L 9/08* (2006.01)

(52) U.S. Cl.
CPC ............ *H04L 9/3247* (2013.01); *H04L 9/0869* (2013.01); *H04L 2209/24* (2013.01); *H04L 2209/72* (2013.01)

(58) Field of Classification Search
None
See application file for complete search history.

(56) References Cited

U.S. PATENT DOCUMENTS

| | | | |
|---|---|---|---|
| 5,822,432 A | 10/1998 | Moskowitz et al. | |
| 6,209,091 B1 | 3/2001 | Sudia et al. | |
| 6,687,375 B1 | 2/2004 | Matyas, Jr. et al. | |
| 7,107,452 B2 | 9/2006 | Serret-Avila et al. | |
| 7,215,773 B1 | 5/2007 | Johnson | |
| 7,383,441 B2 | 6/2008 | Vorbruggen et al. | |
| 7,394,573 B1 | 7/2008 | Goldberg et al. | |
| 7,437,561 B2 | 10/2008 | Beuque et al. | |
| 7,490,240 B2 | 2/2009 | Scheidt et al. | |
| 8,122,255 B2 | 2/2012 | Merrill | |
| 8,285,991 B2 | 10/2012 | Scheidt | |
| 8,363,944 B2 | 1/2013 | Koike | |
| 8,402,276 B2 | 3/2013 | Berringer et al. | |
| 8,430,301 B2 | 4/2013 | Tian et al. | |
| 8,677,131 B2 | 3/2014 | Sharma | |
| 9,059,858 B1 * | 6/2015 | Giardina | H04L 9/3226 |
| 2004/0261016 A1 * | 12/2004 | Glass | G06F 17/30014 715/230 |
| 2005/0063027 A1 | 3/2005 | Durst, Jr. et al. | |
| 2006/0115797 A1 | 6/2006 | Gray | |
| 2008/0177799 A1 | 7/2008 | Wilson | |
| 2011/0161674 A1 * | 6/2011 | Ming | G06F 21/64 713/181 |
| 2012/0125997 A1 | 5/2012 | Burra et al. | |
| 2012/0187185 A1 | 7/2012 | Sayan | |
| 2012/0308003 A1 * | 12/2012 | Mukherjee | G09C 5/00 380/243 |
| 2013/0018726 A1 | 1/2013 | Ionescu et al. | |
| 2013/0228630 A1 * | 9/2013 | Fan | G06K 19/06103 235/494 |

(Continued)

FOREIGN PATENT DOCUMENTS

EP 2 696 325 2/2014
WO 2010 147 951 12/2010

(Continued)

Primary Examiner — Shin-Hon Chen
(74) Attorney, Agent, or Firm — Emerson Thomson Bennett, LLC

(57) ABSTRACT

Provided is a system and a method for generating and authenticating a digital signature on a physical document. The system and method includes the use of a document having a code embedded therein (e.g., a Radio Frequency Identification Code and/or a Near Field Communication Code), a first user computing device having a first user application software and a code reader, a second user computing device having a second user application software and a code reader, a printer for printing a digital signature on the document, and a main application server for generating, encrypting and authenticating a digital signature, the data integrity of the document and status of the document.

15 Claims, 3 Drawing Sheets

(56) References Cited

U.S. PATENT DOCUMENTS

2015/0058633 A1* 2/2015 Liu .................... H04L 63/0823
713/175
2015/0095352 A1* 4/2015 Lacey ............... G06F 17/30011
707/752

FOREIGN PATENT DOCUMENTS

| WO | 2012 151 290 | 11/2012 |
| WO | 2013 034 681 | 3/2013 |
| WO | 2013 136 304 | 9/2013 |

* cited by examiner

SYSTEM AND METHOD FOR APPLYING A DIGITAL SIGNATURE AND AUTHENTICATING PHYSICAL DOCUMENTS

I. BACKGROUND

A. Technical Field

Provided is a system and method of providing a digital signature for any type of physical document, verifying the status of any type of physical document, including but not limited to bonds, vouchers, certificates, drivers licenses, deeds, passports, identification cards, contracts and legal documents. The system and method enables an examiner to establish the veracity of a document by validating its authenticity, data integrity, signatory and status.

B. Description of Related Art

Conventional ways of authenticating documents mainly involve verifying the signature or stamp of issuer, the physical security features of the document (e.g., the size of the document) and any sophisticated graphical patterns, water mark(s), special ink(s) or hologram(s) embedded within the document. All of these methods of verification and authentication are capable of being copied or duplicated. Accordingly, none of these methods of verification and authentication completely eliminate fraud or allow the documents examiner to confirm the authenticity and the genuineness of a document.

The present disclosure provides a system and method to authenticate any type of document. This alleviates the above-mentioned disadvantages of conventional document authentication methods and provides a highly secure way to authenticate any type of physical document.

II. SUMMARY

Provided is a system for generating and authenticating a digital signature on a document. The system includes the following features: a document containing a first electronic code embedded within the document; a first user computing device comprising a first user application software and a first code reader, wherein the first user application transmits document information and the first code reader reads the first code from the document; a main application server for receiving document information and the first code transmitted from the first user computing device, wherein the main application server is programmed to generate a document identification number, associate the document identification number with the document information, store the document information and document identification number on a database within the main application server, encrypt the document identification number utilizing the first code as a first key and a character string generated by the main application server as a second key, generate a second code which includes the encrypted document identification number and send the second code to the first user's computing device; a printer to print the second code received from the main application server on the first user's computing device on the document as a digital signature; and a second user computing device comprising a second user application software, a first code reader for reading the first code and a second code reader for reading the second code, wherein the second user application transmits document information relating to the first code and the second code from the document to the main application server, wherein the main application server decrypts the second code to obtain the document identification number, retrieves the document information from the database using the decrypted document identification number and sends the decrypted document information to the second user for authentication and verification.

According to one aspect of the disclosed system, the first code is an alpha-numeric string of information stored in a Near Field Communication Tag (an NFC Tag).

According to another aspect of the disclosed system, the first code reader is a NFC reader.

According to another aspect of the disclosed system, the first code is an NFC Tag and the first code reader is an NFC reader, further wherein the NFC reader is built in to the first user's computing device.

According to another aspect of the disclosed system, the second code is a two-dimensional code, the second code reader is a two-dimensional code reader comprising a camera or scanner and the two-dimensional code reader is built into the second user's computing device.

According to another aspect of the disclosed system, the character string is an alpha-numeric string randomly generated by the main application server.

According to another aspect of the disclosed system, the alpha-numeric string is randomly generated as a sequence-based event.

According to another aspect of the disclosed system, the randomly generated alpha-numeric string is sequence-based, which is generated based on the first user request to obtain the encrypted document identification number.

According to another aspect of the disclosed system, in cases where the different first users for the same document send multiple requests for digital signatures, different alpha-numeric string may be generated with different sequence numbers.

According to another aspect of the disclosed system, the main application server decrypts the second code prior to utilizing the first code.

According to another aspect of the disclosed system, the main application server decrypts the second code to obtain information required to decrypt the document ID.

According to another aspect of the disclosed system, the second code is a two-dimensional code which is encrypted.

According to another aspect of the disclosed system, the first code may be utilized multiple times for multiple signatories of the document to generate multiple digital signatures on the document, wherein each of the multiple digital signatures on the document are different correspond to one of the multiple signatories of the document.

According to another aspect of the disclosed system, the document identification number is confidential in that it is held by the main application server and it is not disclosed to the first or second user.

According to another aspect of the disclosed system, the main application server, having received a request from the first user for the digital signature, subsequently sends a request to the first user to read the first code embedded within the document and to send the first code to the main application server.

According to another aspect of the disclosed system, the request for a digital signature issued by the first user includes information related to at least one of physical identification information of the document, details about the issuer of the document, details about the document itself and details about the signatory of the document.

According to another aspect of the disclosed system, the first user must be registered with the main application server before a request for the digital signature can be sent to the main application server.

According to another aspect of the disclosed system, the first user is an individual, an organization, a business entity, a governmental agency or the signatory of a document and wherein the second user is an individual, an organization, a business entity or a governmental agency charged with examining the document.

According to another aspect of the disclosed system, the first user computing device and the second user computing device is registered with the main application server.

According to another aspect of the disclosed system, the first user computing device and the second user computing device is a computer, a desktop computer, a laptop computer, a tablet or a smartphone.

III. BRIEF DESCRIPTION OF THE DRAWINGS

IV. DETAILED DESCRIPTION

Figure 1:
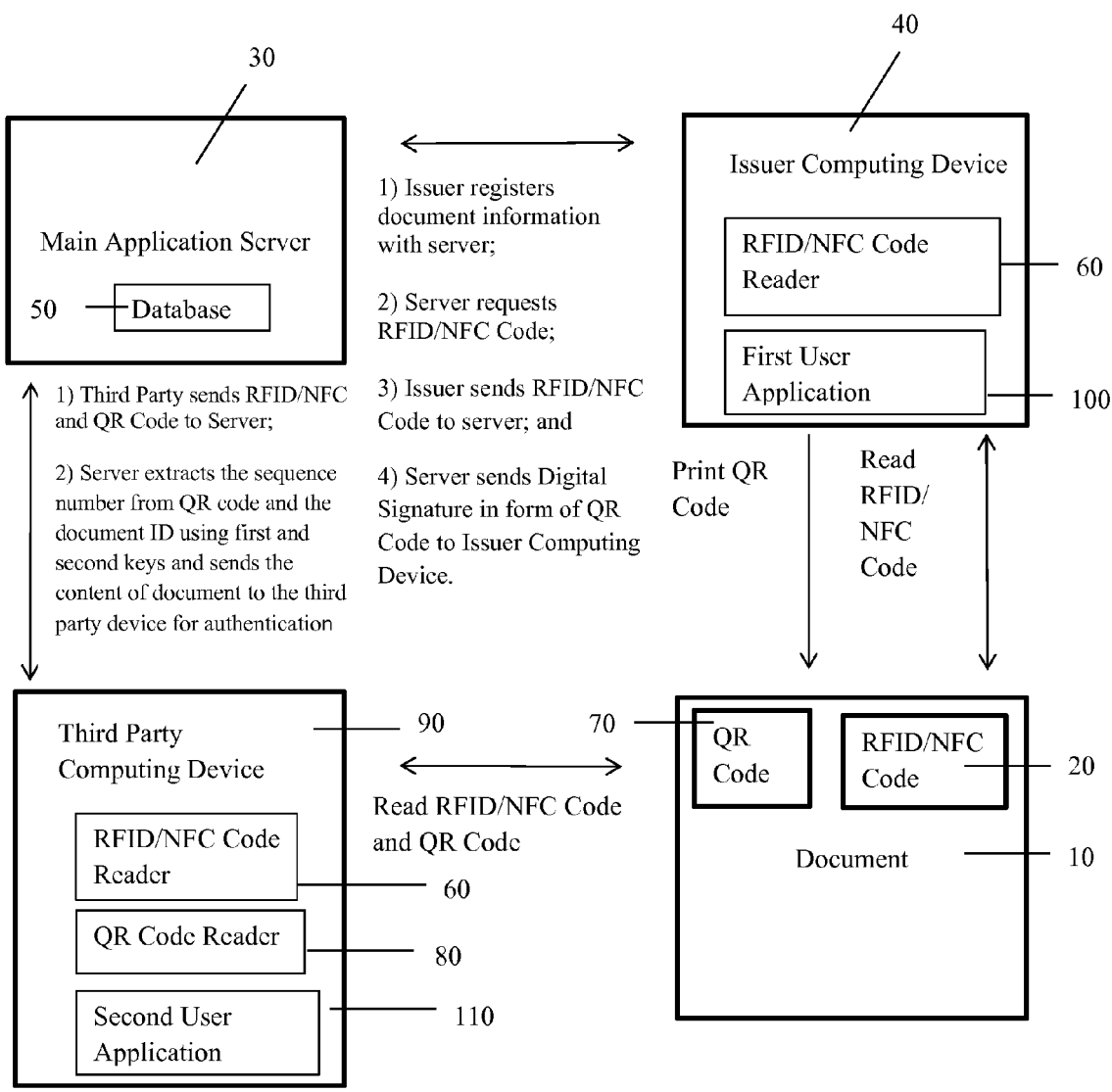
FIG. 1 is a diagram illustrating an exemplary embodiment of the process of obtaining and authenticating a digital signature.

Provided is a system and method for identifying, verifying and authenticating the issuer of any type of physical document, including but not limited to bonds, vouchers, certificates, drivers licenses, deeds, passports, identification cards, labels, contracts and legal documents.

The system utilized to apply a digital signature on a physical document of includes at least the following three (3) components: 1) a main computer server comprising application software and referred to as a main application server; 2) user application software running on any personal computer, desktop, laptop, tablet or smart phone; and, 3) a secure document having a Near Field Communication (NFC) tag or a Radio Frequency Identification (RFID) tag embedded therein.

The main application server manages and monitors the entire process such as registering the issuers, the documents, the data base, inquiries, security, encryption and communication with the user application and allows users to access to the information via their computers.

The user application is a software running on the user's computer, tablet or smartphone enabling the user to establish a secure communication with the main application software on the main application server and access its available services. The user application software may communicate with the main application server through a secure wireless, wired, broadband or narrowband connection.

The secure document is a paper with an embedded RFID/NFC tag enabling users to print their text on it and receive a unique digital signature associated with the embedded RFID/NFC tag, which is also printed on the document from the main server.

More specifically, the system includes a main computer server, an issuer or first user computing device, a printer and, in certain embodiments, a third party or second user computing device. The main computer server may be a main application server having application software. The issuer and third party computing device may be any type of computing device known in the art including but not limited to a smartphone, a tablet, a laptop or a desktop computer. The issuer or first user computing device includes a Radio Frequency Identification (RFID) scanner/reader or a Near Field Communication (NFC) scanner/reader. The third party or second user computing device includes an RFID scanner/reader or an NFC scanner/reader and a Quick Response Code (QR Code) scanner/reader. The issuer computing device includes application software for applying a digital signature. The third party computing device includes application software for verifying and authenticating a digital signature.

Application of a Digital Signature onto a Physical Document

Requesting the digital signature by a document issuer initiates a process in the main application server of assigning a unique document identification number to the registered document. The main application server then encrypts the document identification number and uses the results to generate a digital signature in the form of a two-dimensional code containing the encrypted document identification number, which will be sent to the issuer and printed on the document.

According to another aspect of the disclosed system, the two dimensional code is one of Aztec code, barcode, mCode, QR code, ColorCode, Color Construct Code, CrontoSign, CyberCode, DataGlyphs, Data Matrix, DataStrip Code, EZcode, digital paper, High Capacity Color Barcode, HueCode, InterCode, MaxiCode, mobile multi-colored composite (MMCC), NexCode, PDF417 (Portable Data File), Qode, ShotCode and SPARQCode. According to a further aspect of the disclosed system, the two-dimensional code is a QR code.

Figure 2:
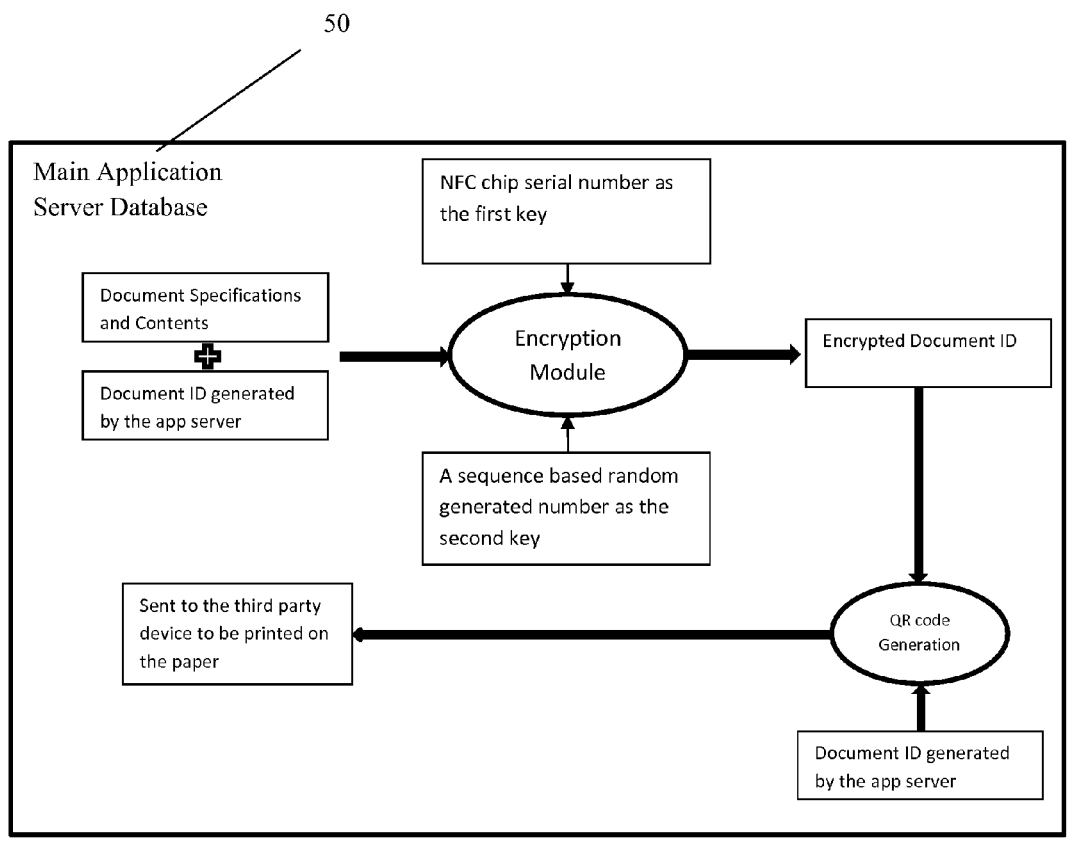
FIG. 2 is a diagram illustrating an exemplary embodiment of the process of encrypting a document identification number.

With reference to FIGS. 1 and 2, the system, in one embodiment, applies a digital signature to a physical document in the following manner. First, an individual (hereinafter referred to as "an issuer" or "first user") obtains a secure document (10) having a Radio Frequency Identification Code (RFID) or a Near Field Communication (NFC) tag (20) embedded therein. The issuer or first user then generates or obtains specific document information and sends the specific document information to the main application server (30) through a first user application (100) on the issuer or first user computing device (40). Non-limiting examples of such document information include information about the physical and visual attributes of the document, the content of the document, information about the issuer or first user, information about the signatory and/or a digital image of the document itself. Once the main application server (30) receives the document information, it generates a document identification number and saves the information on a database (50). The document identification number is only known by the main application server. It is not shared with the issuer or anyone else. The main application server (30) then sends a request to the issuer or first user to read the NFC or RFID tag (20) embedded within the document (10). The issuer or first user receives the request through the first user application (100). The issuer or first user then utilizes an NFC reader or an RFID reader (60) within his or her computing device (40) to read the NFC tag or RFID tag (20) embedded within the document (10) and sends coded information related to the NFC tag or RFID tag (20) through the first user application (100) to the main application server (30). In alternative embodiments, the issuer or first user may send the coded information related to the RFID/NFC tag to the main application server (30) through the RFID/NFC reader. Once the main application server (30) receives the NFC/RFID tag information, using the NFC/RFID tag information as the first key, the main application server (30) then generates a random alpha-numeric string and encrypts the document identification number, with both, the randomly generated unique alpha-numeric string as the second key and the NFC/RFID tag information as the first key, using an encryption method. Non-limiting examples of encryption methods, which may be utilized to generate the QR Code, include Advanced Encryption Standard (AES) and Data Encryption Standard (DES). The second key is stored in the database (50) of the main application server (30) in association with its sequence number as shown in FIG. 2. The main application server (30) then creates a Quick Response (QR) Code. The QR Code includes the document identification number which is encrypted with the first and second keys and the second key sequence number. After the QR Code is created, the main application server (30) sends the QR Code to the issuer or first user. The issuer or first user receives the QR Code through the first user application (100) on the issuer or first user computing device (40). The issuer or first user then uses a printer (not shown) to print the QR Code (70) directly onto the document (10). Once on the document (10), the QR Code (70) can be utilized as a digital signature to authenticate the document (10).

One feature which may be present in certain embodiments of the above-described system and method is that registration of a document on the main application server may only be performed by an issuer, organization or other authorized personnel who is also registered with the main application server. In certain embodiments, the issuer or first user must be registered with the main application server to ensure that only authorized personnel can gain access to the system. In further embodiments, the issuer's or first user's computing device must be registered with the main application server to ensure that only authorized personnel can gain access to the system. This feature prevents others from being able to register sensitive documents except only authorized individuals and allows anyone from any location to confirm the authenticity of the document. It also confirms that the individual or organization claiming authenticity of the digital signature has issued the document. Accordingly, in certain embodiments, before a first user or issuer can obtain the digital certificate from the main application server, the first user or issuer may be required to establish an account and register with an individual or organization which operates the main application server. By requiring that the issuer or first user have an account and register with the main application server, the main application server can verify the authority of the issuer or first user to create a document certified with a digital signature. Registering the issuer or first user of a document with the main application server also allows the main application server to enable the issuer or first user to register the document and any details related to the document which may need to be authenticated by a third party (i.e., a second user). In order to generate a unique document identification number for each document, the system utilizes information obtained from a Radio Frequency Identification (RFID) tag or Near Field Communication (NFC) tag embedded within the document. Furthermore, the unique digital signature generated by the main server and printed on the document may associate to a combination of different unique factors, such as the physical and visual identification information of the document (e.g., the type, size and formatting of the document), details about the issuer or first user of the document (e.g., residence, personal identification numbers, employment, physical description and other biographical information), details about the document itself (e.g., the content of the document), details about the signatory of the document (e.g., residence, personal identification numbers, physical description and any other biographical information) and details about the status of the document (e.g., valid or in force, canceled, revoked, stolen, etc.).

In certain embodiments, the first user or issuer of the document may be an individual, an organization or the signatory of the document. In further embodiments, the individual, organization or signatory must register the document with the main application server to receive the document identification number in the form of an encrypted QR Code and have it printed on the document itself. By encrypting the document identification number with two keys (i.e. a first key based on data stored in the RFID/NFC tag embedded within the document and a second key generated by the main application server and linked to a sequence number), a document examiner (e.g., a third party or second user) is able to confirm the authenticity of the actual document in his or her possession. A document examiner can also discover the current status of document or any alteration on the documents or possible fraud by comparing the details of the document registered (e.g., an image of the document) on the main application server with the document in his or her possession.

To access the main application server, the issuer or first user first installs a first user application (100) on his/her computing device or computer (40) to establish a connection with the main application server (30). The first user application may include an RFID reader or a NFC Code reader. In certain embodiments, however, the RFID/NFC code reader may be a component of the computing device (40) but not necessarily a component of the first user application. In certain embodiments, the issuer or first user registers himself or herself with the system and receives a login access code to log in to the server. The issuer may be an individual, a business entity or any type of organization. The registration process enables the issuer or first user to register any type of document as well as multiple documents in unlimited numbers with the system and to receive a digital signature unique to each individual document which can be printed on the document(s). The issuer may provide the main application server (30) with details of the registered documents, including but not limited to a reference number, the issuing date, the signatory or simply an image of the document (10) which is to be authenticated. After the main application server (30) receives this information, it assigns a unique document ID to the registered document (10). The document ID is not disclosed to the user or issuer and is used only by main application server (30). The first user or issuer then reads the RFID/NFC tag (20) embedded within the document (10) with an RFID/NFC reader (60). In certain embodiments, the main application server (30) sends a request to the first user or issuer to read the RFID/NFC tag (20) embedded within the document (10) and to send the information embedded within the RFID/NFC tag (20) to the main application server (30). In other embodiments, reading of the RFID/NFC tag (20) embedded within the document and sending the related information embedded therein to the main application server (30) may be performed at the first user's or issuer's own initiative.

In embodiments where the first user or issuer is utilizing a first user application software on a smartphone, the first user or issuer may tab the smartphone on the document he/she wants to register. An RFID/NFC reader on the Smartphone can then be used to read the RFID/NFC tag embedded within the document. The first user application on the smartphone will then send the RFID/NFC tag information to the main application server in a secure manner.

The main application server uses the RFID/NFC tag information as the one of the keys (e.g., a first key) to encrypt the document identification number generated by the main application server. The main application server also generates a unique alpha-numeric string which is randomly generated and associated with a sequence number as a second key to encrypt the document identification number generated by the main application server. After obtaining the first and second keys to encrypt the assigned document identification number, the main application server uses the encrypted document identification number and the sequence number associated with the second key to create an encrypted QR Code. In certain embodiments, the QR Code is encrypted utilizing an encryption method. Non-limiting examples of encryption methods, which may be utilized to generate the QR Code, include Advanced Encryption Standard (AES) and Data Encryption Standard (DES). The main application server then sends the encrypted QR Code to the user's or issuer's application software. The user or issuer then uses the application software to print the QR Code as a digital signature on the registered document.

Thus, the QR Code is an encrypted QR Code and provides another layer of security. Individuals may be able to read the QR Code but cannot extract any valid information contained or encrypted within the QR Code. Such encrypted information may include the document identification number, the sequence number associated with the second key or any other details provided by the signatory or organization requesting the digital signature.

By creating an encrypted QR Code, the main application server can prevent any unauthorized access to the encrypted document identification number in case an individual were to read the QR Code printed on the document. By printing the encrypted QR Code on the document the securing process is finalized.

The RFID/NFC tag which is embedded within a physical document is unique in that it is specific to that particular document. For example, RFID/NFC tags may be encoded to indicate an organization code and/or a document code. In such cases, the information contained within the RFID/NFC tag should match with the organization creating the document or the type of document being created or digitally signed. For example, the issuing authority may be a governmental agency authorized to issue passports. In such cases, the agency charge with issuing passports may have a unique organization code and the passport itself may have a different document code. If the agency, however, is also charged with issuing a different type of document (i.e., different from passports), it may utilize a different document code unrelated to passports. These organization and document codes would all be known by the main application server. Furthermore, providing this additional level of security through an organization and/or document code will further reduce the possibility of fraud.

In addition, the document-specific RFID/NFC tag may be used multiple times for the same document. For example, if there are more than one signatory for a particular document and those signatories wish to add their digital signature to the document, they can each register the same document under their own registered name with the main application server and receive a unique QR Code. Thus, the registered document may have multiple QR Codes, each being a digital signature of one of the signatories. In such cases, the QR Codes are created by the same RFID/NFC tag and belong to the same document. However, different document identification numbers and different keys are generated by the main application server based on the separate requests of each individual or user. This same method can be used if one or more additional organization(s) would like to add their digital signature to the document.

To encrypt the document identification number, the computer application server may use one of the well-known conventional encryption algorithms such as Data Encryption Standard (DES) or Triple Data Encryption algorithm (often referred to as Triple DES, 3DES, TDEA or Triple DEA). The first key is the RFID or NFC tag embedded within the document. The second key is a unique string of alpha-numeric string randomly generated by the main application server. The encrypted result is then used to generate a QR Code which is printed on the same physical document.

As mentioned above, the main application server generates a unique alpha-numeric string which is randomly generated as a second key to encrypt the document identification number.

Verifying and Authenticating a Digital Signature Applied to a Physical Document

Figure 3:
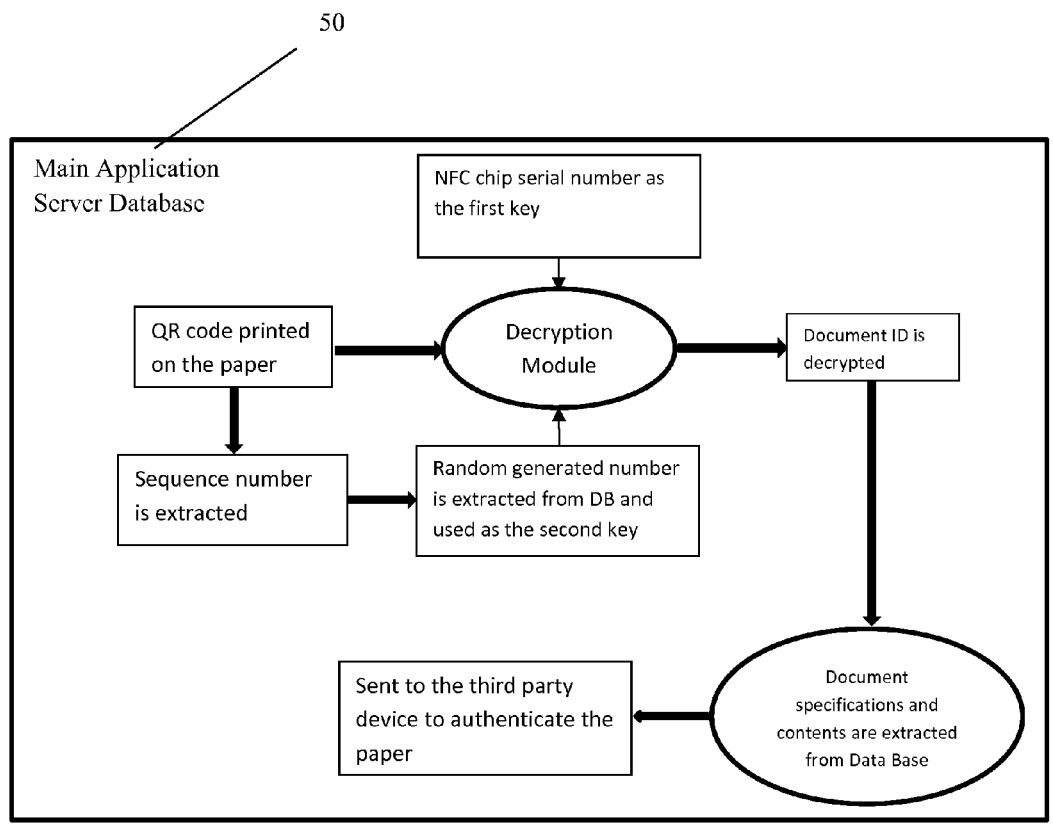
FIG. 3 is a diagram illustrating an exemplary embodiment of the process of authentication of a document.

With reference to FIGS. 1 and 3, to check the authenticity of the document, a second user or third party reads both the QR Code (70) printed on the document (10) and the RFID/NFC tag (20) embedded within the document (10) to retrieve the encrypted document information and sends the encrypted document information to the main application server (30). The main application server (30) uses the code retrieved from the embedded RFID/NFC tag within the document (10) as the first key and uses the information retrieved from the QR Code to find both the encrypted document identification number and the sequence number associated with the second key. By having this information, the server can access the second key and by using both the first key and the second key, the server can decrypt the encrypted document identification number to access the database entry related to the document (10) being authenticated. Once the database entry for the requested document is accessed, information registered by the issuer or first user of the document (10) is provided to the second user or third party, thereby enabling the second user or third party to compare the registered document information with the document (10) under examination. If the details of the physical document (10) under examination match the registered document information stored in the main application server (30), the matching data will be proof of the originality and genuineness of the actual physical document (10). In addition, the Examiner will also be able to verify the status of the document (e.g., valid or in force, canceled, revoked, stolen, etc.).

In certain embodiments, reading the RFID/NFC Code is accomplished by an RFID/NFC Code reader and reading the QR Code is accomplished by a QR Code reader while sending or transmitting the RFID/NFC Code and the QR Code to the main application server (30) is accomplished by a second user application (80) on the third party or second user computing device (90). In other embodiments, the RFID/NFC Code and the QR Code may be sent or transmitted to the main application server (30) respectively by the RFID/NFC Code reader and the QR Code reader. In further embodiments, the second user application (80) sends or transmits both encrypted information related to the RFID/NFC Code and QR Code as well as non-encrypted document information to the main application server (30). The second user application (80) also receives information sent or transmitted from the main application server (30) to the third party or second user's computing device (90).

More specifically, in certain embodiments, an individual or third party may verify and authenticate the digital signature provided by the QR Code (70) on the physical document (10) in the following manner. First, a second user or third party wishing to authenticate the document (10) reads the RFID/NFC tag (20) embedded within the document using an RFID/NFC reader (60) on his or her computing device (90) and sends the RFID/NFC tag information (20) through a second user application (110) on the computing device (90) to the main application server (30). The second user or third party then reads the QR Code (70) on the document (10) using a QR Code reader (80) on his or her computing device (90) and sends the QR Code (70) to the main application server (30). Alternatively, the second user or third party may read the QR Code (70) and send it to the main application server (30) prior to reading the RFID/NFC Code (20) and sending the RFID/NFC Code (20) to the main application server (30). Once the main application server (30) receives the QR Code (70) and the RFID/NFC Code (20) from the second user or third party, it can decrypt the second code and obtain the sequence number associate with the second key and accordingly, the document identification number. In order to accomplish the decryption step, the main application server (30) deciphers the second key by decrypting the QR Code (70) and finding the sequence number associated with the second key. The sequence number associate with the second key is embedded within the QR Code (70). The main application server (30) can retrieve the second key and then use the second key and the RFID/NFC Code (20) provided by the second user or third party as the first key to decrypt or obtain the document identification number. The main application server (30) then retrieves the document's information from the database (50) using the decrypted document identification number. This information is then sent to the second user or third party for verification and authentication.

In certain embodiments, to check the authenticity of the documents, any third party or second user can access the main application server by using a viewer mode within the second user application in the second user computing device without logging into the main application server. This option enables the second user to request an authentication service which will follow by an instruction to tab the document by the computing device (e.g., a Smartphone) and read the RFID/NFC tag. The details will be forwarded to the main application server. After receiving the RFID/NFC tag information and confirming this information as the first key, the main application server may send a request to the second user or third party to read the QR Code using the QR Code reader (e.g., within the Smartphone camera). The details of the QR Code will then be sent to the main application server in a secure way. The main application server then decrypts the QR Code to obtain the sequence number associate with the second key as well as decrypted document identification number and any other information stored in the QR Code for the particular document at issue in order to obtain the second key. The main application server then uses the RFID/NFC tag information as the first key. This enables the main application server to decrypt the document identification number using both keys and retrieve the document information from its database and provide it to the second user or third party to compare and examine the authenticity of the document.

This process may be applied to any type of physical document. For example, this process may be applied to passports. Currently, there are countries which utilize a standard RFID passport. In such passports, the information contained on the visual data page on the passport may also be stored on the RFID chip for additional security. An example of a country that utilizes standard RFID passports is Great Britain. The British e-passport, however, was hacked in less than 48 hours after its first release. This confirms that criminals are able to easily alter such documents. In some cases, criminals may steal blank passports and create deceptively issued passports which are identical with those created by the issuing authority. In such cases, there is no way to confirm the authenticity of such documents expect through inquiry with the issuing authority. By using the disclosed system and method for applying a digital signature and authenticating physical documents for passports, the issuing authority may receive a digital signature as a QR Code in addition to the RFID/NFC tag embedded within the passport. The QR Code would be printed on the passport, enabling any examiner around the world to easily examine the authenticity of the passport. Further, in the case of a black listed or stolen passport, the passport authority could immediately amend the document information registered for that specific passport and inform the examiner about the negative status.

Another example where the disclosed system and method for applying a digital signature and authenticating physical documents is for legal documents such as notary services. By using the above-mentioned system and method, any notary could be registered as the issuer, register the details of a document which has been notarized by them and receive a digital signature to be printed on the document. The authenticity of such documents may be examined by anyone from anywhere in the world. A non-limiting example of legal document which may be utilized with the above-mentioned system and method is a power attorney. In the event that an individual wishes to "cancel" the power attorney, he or she can submit a request to "cancel" to the notary who notarized the power of attorney at any time. The notary would then access the main application server and change the status of that document to "canceled" on the system. Alternatively, the individual who signed the power of attorney may establish a secure account with the main application server which will allow him or her to change the status of the power of attorney or other legal document on his or her own. When the legal document is presented to an institution (for example, a court, bank, agency, legal office, etc.), the institution can utilize an RFID/NFC scanner and QR Code scanner to authenticate the document and verify that the status of the document is current.

Another example where the disclosed system and method for applying a digital signature and authenticating physical documents is for certificates. A non-limiting example of a certificate which may be used with the above-mentioned system and method is a university certificate or transcript. The university may use the above-mentioned system to issue and authenticate their certificate or transcript. The university issued certificate or transcript may then be examined by anyone from anywhere in the world at any time to check the authenticity of the certificate or transcript.

Numerous embodiments have been described herein. It will be apparent to those skilled in the art that the above systems and methods may incorporate changes and modifications without departing from the general scope of this invention. It is intended to include all such modifications and alterations in so far as they come within the scope of the appended claims or the equivalents thereof. The phrase "associated with" as used in this document, refers to structures which support the disclosed system and method and may also refer to structures not disclosed herein capable of supporting the disclosed system and method. Further, the "invention" as that term is used in this document is what is claimed in the claims of this document. The right to claim elements and/or sub-combinations that are disclosed herein as other inventions in other patent documents is hereby unconditionally reserved.

Having thus described the disclosed system and method, it is now claimed.

What is claimed is:

1. A system for generating and authenticating a digital signature on a document comprising:
   a document containing a first code embedded within the document;
   a first user computing device comprising a first user application software and a first code reader, wherein the first user application transmits document information and the first code reader reads the first code from the document;

a main application server for receiving document information and the first code transmitted from the first user computing device, wherein the main application server is programmed to generate a document identification number, associate the document identification number with the document information, store the document information and document identification on a database within the main application server, encrypt the document identification number utilizing the first code as a first key and a character string generated from the main application server as a second key, generate a second code which includes the encrypted document identification number and send the second code to the first user's computing device, wherein the first code is an alphanumeric string of information stored in a Near Field Communication Tag (an NFC Tag) and the second code is a Quick Response Code (QR Code);

a printer to print the second code, received by the first user's computing from the main application server, on the document as a digital signature; and a second user computing device comprising a second user application software, a first code reader for reading the first code and a second code reader for reading the second code, wherein the second user application transmits document information relating to the first code and the second code from the document to the main application server, wherein the main application server decrypts the second code to obtain the document identification number, retrieves the document information from the database using the decrypted document identification number and sends the decrypted document information to the second user for authentication and verification.

2. The system of claim 1, wherein the first code reader is a NFC reader.

3. The system of claim 2, wherein the first code is an NFC Tag and the first code reader is an NFC reader comprising a camera, further wherein the NFC reader is built in to the first user's computing device.

4. The system of claim 3, wherein the second code is a two-dimensional code and wherein the second code reader is a two-dimensional code reader comprising a camera, further wherein the two-dimensional code reader is built into the second user's computing device.

5. The system of claim 1, wherein the character string is an alpha-numeric string randomly generated by the main application server.

6. The system of claim 5, wherein the alpha-numeric string is a randomly generated sequence-based event.

7. The system of claim 6, wherein the randomly generated alpha-numeric string is sequence-based, based on the first user request to obtain the encrypted document identification number.

8. The system of claim 1, wherein the first code may be utilized multiple times for multiple signatories of the document to generate multiple digital signatures on the document, wherein each of the multiple digital signatures on the document are different and correspond to one of the multiple signatories of the document.

9. The system of claim 1, wherein the document identification number is confidential in that it is held by the main application server and it is not disclosed to the first or second user.

10. The system of claim 1, wherein after receiving a request from the first user for the digital signature, the main application server sends a request to the first user to read the first code embedded within the document and to send the first code to the main application server.

11. The system of claim 10, wherein a request for the digital signature issued by the first user includes information related to at least one of physical identification information of the document, details about the issuer of the document, details about the document itself and details about the signatory of the document.

12. The system of claim 11, wherein the first user must be registered with the main application server before the request for the digital signature can be sent to the main application server.

13. The system of claim 1, wherein the first user is an individual, an organization, a business entity, a governmental agency or the signatory of the document and wherein the second user is an individual, an organization, a business entity or a governmental agency charged with examining the document.

14. The system of claim 1, wherein the first user computing device and the second user computing device is registered with the main application server.

15. The system of claim 1, wherein the first user computing device and the second user computing device is a computer, a desktop computer, a laptop computer, a tablet or a smartphone.

* * * * *